United States Patent [19]
Crank et al.

[11] Patent Number: 5,645,867
[45] Date of Patent: Jul. 8, 1997

[54] HEATED DISTRIBUTION MANIFOLD

[75] Inventors: Doug Crank; John Carter, both of Holland, Mich.

[73] Assignee: Donnelly Corporation, Holland, Mich.

[21] Appl. No.: 680,977

[22] Filed: Jul. 16, 1996

Related U.S. Application Data

[63] Continuation of Ser. No. 258,738, Jun. 13, 1994, abandoned.

[51] Int. Cl.$^6$ ..................................................... B29C 45/78
[52] U.S. Cl. ........................................... 425/144; 264/406
[58] Field of Search ..................... 425/143, 144, 425/570, 572; 264/297.2, 328.8, 40.6; 422/211

[56] References Cited

U.S. PATENT DOCUMENTS

| | | | |
|---|---|---|---|
| 3,423,570 | 1/1969 | Trabilcy | 392/483 |
| 3,704,723 | 12/1972 | Wheaton | 137/341 |
| 4,219,323 | 8/1980 | Bright et al. | 425/572 |
| 4,256,140 | 3/1981 | Swaroop et al. | 137/561 A |
| 4,292,018 | 9/1981 | Beale | 425/144 |
| 4,500,278 | 2/1985 | Devellian et al. | 425/548 |
| 4,600,375 | 7/1986 | Honsho et al. | 425/174.4 |
| 4,609,341 | 9/1986 | Muller | 425/547 |
| 4,688,622 | 8/1987 | Gellert | 164/61 |
| 4,761,343 | 8/1988 | Gellert | 425/570 |
| 5,028,399 | 7/1991 | Suppelsa et al. | 422/211 |
| 5,032,078 | 7/1991 | Benenati | 425/510 |
| 5,227,179 | 7/1993 | Benenati | 425/547 |
| 5,411,686 | 5/1995 | Hata | 264/40.6 |

FOREIGN PATENT DOCUMENTS

3243826  5/1984  Germany .

*Primary Examiner*—Tim Heitbrink
*Attorney, Agent, or Firm*—Fitzpatrick, Cella, Harper & Scinto

[57] ABSTRACT

A distribution manifold assembly for carrying a fluid includes a manifold body having at least one fluid channel running therethrough, and at least one infrared radiation source dimensioned and disposed to apply infrared radiation to the external surface of the manifold body. If desired, a control means controls the application of infrared radiation by within the fluid channel remains substantially constant. An insulation layer can surround at least a portion of the manifold body, and this insulation layer is disposed so as not to obstruct completely the infrared radiation source. In a second embodiment, the manifold assembly has a primary manifold body having at least one fluid channel running therethrough, and first and second surfaces so that there are first and second elongate hollows. First and second infrared radiation sources are contained within the elongate hollows. A method of heating a fluid distribution manifold having an internal fluid channel is also provided.

21 Claims, 4 Drawing Sheets

HEATED DISTRIBUTION MANIFOLD

This application is a continuation-in-part continuation, of application Ser. No. 08/258,738 filed Jun. 13, 1994, now abandoned.

BACKGROUND OF THE INVENTION

1. Field of the Invention

The present invention generally relates to manifolds for conveying fluids, and more particularly, pertains to heated distribution manifolds for conveying molten plastic.

2. Description of the Related Art

Modern plastic injection molding techniques involve forcing molten plastic at high pressure into a mold. Modern plastic materials are temperature sensitive, and typically have narrow thermal processing ranges. If the material being injection molded is too cool, it may not be molded properly. If it is too hot, it may decompose. Moreover, many thermoplastic materials have a limited lifespan when kept at their optimal molding temperatures.

In injection molding, the usual source of molten plastic is a screw/ram-type injector. The molten plastic is guided from the source to the mold through a suitable manifold and drop structure. Economies of scale may favor the use of more than one mold, and in such cases the manifold structure may contain a number of passageways leading through drops to the individual mold cavities.

The plastic leaving the screw extruder or other plastic source is molten, and flows under pressure. It is important to regulate the temperature of the plastic melt carefully, since the plastic temperature directly and markedly effects the molding process. If the molten plastic is too cool, it may not properly fill the molds, or the plastic may not take on its desired shape in the mold. If the plastic cools even further, it will solidify, and plastic flow through the system will stop. Now, manufacturing time will be lost while the system is cleaned.

Accordingly, it is known to heat the manifold structure which carries the molten plastic from the ram/screw extruder to the molds. One way of heating the manifolds is to embed electrical resistance heaters in the manifold structure, as described, for example, in U.S. Pat. Nos. 4,219,323, 4,256, 140, 4,609,341, 4,688,622, and 5,032,078. Alternatively, U.S. Pat. No. 3,704,723 suggests providing cylindrical non-directional radiant energy sources in bores running through the manifold.

Manifolds which are heated by resistance heaters embedded in the manifold are prone to "hot spots". These "hot spots" are caused by the way in which the resistance heaters are constructed. Resistance heaters typically consist of a piece of conductive wire wrapped around an insulating core. That assembly is covered by a suitable material such as ceramic, which is encased in a metallic jacket. Since the conductive wire becomes extremely hot when current passes therethrough, and to avoid short circuits, the core and cover are usually made of ceramic material.

Since the metallic jackets are difficult to machine accurately, available heaters do not have constant diameter outer surfaces. Variations of 0.020"/foot are typical. It is these variations which cause the "hot spots".

Because some parts of the heater jacket are narrower than the diameter of the bore in which the heater is placed, not all of the surface of the heater contacts the manifold block. As a result, heat generated by the resistance heater only passes into the manifold block at those points where the outer surface of the resistance heater jacket contacts the inside of the surrounding bore in the manifold. However, since the entire heater is generating thermal energy, the amount of energy which is being transferred where the heater touches the block may exceed the thermal conduction ability of the block. Thus, these regions will heat up dramatically, forming "hot spots" within the manifold.

Such "hot spots" are undesirable because they can overheat the molten plastic flowing through the manifold. This is a serious problem, since many plastics used in injection molding have limited thermal stability, and they will decompose if heated excessively. Depending on how a plastic decomposes, it may form carbon or other material which will contaminate the product and possible plug the manifold. A far more serious problem arises if the molten plastic decomposes into substances which react with the remaining plastic or the manifold itself. Violent explosions may occur, possibly destroying the injection molding system. For example, if some polyvinyl chlorides (PVC) reach too high a temperature, or are held too long at an elevated temperature, they can degrade and form, among other things, hydrochloric acid (HCl). This hot CL can react with the manifold and mold bodies, and cause a catastrophic explosion.

The desirability of avoiding "hot spots" is therefore well-known. The prior art suggests various ways to avoid forming such "hot spots". One approach is to regulate more accurately the temperature of the resistance heaters. For example, in order to more precisely control the temperature of the manifold, U.S. Pat. No. 4,292,018 suggests using several separately-controlled resistance heaters. This structure is said to allow the molten plastic contents of the manifold to be maintained at the optimum temperature, without burning.

Another approach is to improve the fit between the heater and manifold. U.S. Pat. No. 5,032,078 states that the heaters used to warm the manifold have cylindrical outer surfaces that provide a good fit in the matching grooves in the manifold, so that heat will be efficiently and uniformly transmitted to the manifold body.

In an effort to improve contact between the heater and the manifold, U.S. Pat. No. 4,761,343 casts conventional cartridge heaters in copper, the copper in turn being contained within a machined tool steel outer body. However, in practice, thermal cycling of the heaters leads to the formation and enlargement of voids in the copper. Ultimately, when these voids become large, heat transfer is impeded and again, hot spots will form.

However, none of the foregoing approaches toward heating a plastic injection manifold are fully-satisfactory. For example, when electrical cartridge resistance heaters are used, they produce hot spots which can cause plastic degradation, and possible manifold explosions. In addition, it is quite difficult to remove these cartridge heaters when they fail, because with time the hot cartridge body diffuses into and so bonds to the manifold body. Attempts to avoid hot spots through improving heater-manifold contact by pouring molten metal around the heaters are also unsatisfactory, since such heaters are exceedingly difficult to service. Moreover, such manifolds eventually develop hot spots, as over time voids form in the metal surrounding the heaters. Other approaches involving circulating hot liquid through the manifold are also unsatisfactory; the manifold structure is quite complicated, the hot liquid is dangerous, and such systems are subject to failure, for example, where the hot liquid flows into and out of the manifolds.

Since none of the foregoing techniques and devices do a fully-satisfactory job of preventing the formation of "hot spots" in a manifold, there exists a genuine need for a way to reliably and uniformly heat a plastic distribution manifold.

SUMMARY OF THE INVENTION

The present invention relates to a distribution manifold assembly for carrying fluid, and consists of a manifold body having at least one fluid channel running therethrough, and at least one infrared radiation source arranged to apply infrared radiation to the surface of the manifold body. If desired, control means can be provided for controlling the application of infrared radiation by the infrared radiation source so that the temperature within the fluid channel stays substantially constant. Moreover, an insulation layer can surround at least a portion of the manifold body, this insulation layer being disposed so as not to completely obstruct the infrared radiation source.

This invention permits extremely accurate control of the temperature of molten material flowing through a manifold. The molten material can be kept at either a constant temperature, or take on a predetermined temperature profile as it flows through the manifold.

Another embodiment of the present invention is a distribution manifold assembly for carrying a fluid. This assembly includes a primary manifold body having at least one fluid channel running therethrough. The first and second surfaces of the manifold body have first and second concavities running therealong. First and second manifold covers each at least partially enclosing the respective external surfaces are mounted on the first and second surfaces of the primary manifold body, respectively. First and second infrared radiation sources face the first and second concavities, respectively. These radiation sources are dimensioned and disposed to apply infrared radiation to the walls of the first and second concavities, and are each at least partially covered by the corresponding manifold covers.

Furthermore, control means can be provided for controlling the application of infrared radiation by at least one of the first and second infrared radiation sources so that the temperature within the fluid channel remains substantially constant. Again, an insulation layer may surround at least a portion of at least one of the primary manifold body, and the first and second manifold covers.

A further embodiment of this invention is a method of heating a fluid distribution manifold having an internal fluid channel, involving providing at least one infrared radiation source, and applying infrared radiation to a surface of the fluid distribution manifold.

If desired, one can also control the application of infrared radiation so that the temperature within the fluid channel remains substantially constant. At least a portion of the manifold can be insulated in a way that does not interfere with the application of infrared radiation.

BRIEF DESCRIPTION OF THE DRAWINGS

The present invention may be better understood in connection with the accompanying detailed description of the invention and claims, taken together with the with the following drawings in which:

DESCRIPTION OF THE PREFERRED EMBODIMENTS

Particular details of the present invention will be discussed in the following explanation, taken together with the accompanying drawings.

As depicted in FIGS. 1–4, a first embodiment of the invention utilizes an elongated manifold 1 to convey molten plastic from a source, preferably a screw/ram injector (not shown) through manifold inlet 5 to molds 7. The screw/ram injector simultaneously mixes and heats solid plastic particles, causing them to liquify by the time the plastic is discharged. In this regard, it will be appreciated that any other source of molten plastic could be used. For example, the plastic could first be melted and then be conveyed under pressure to the manifold.

Although the generic term "plastic" will be used throughout this specification, it will be understood that the present invention is applicable to all types of thermoplastic materials. For example, it can be used to process polyvinyl chloride (PVC), polystyrene, polyethylene, and polypropylene. Again, it is particularly suited to molding thermoplastics which are temperature sensitive, since it prevents such materials from being overheated.

Figure 3A:
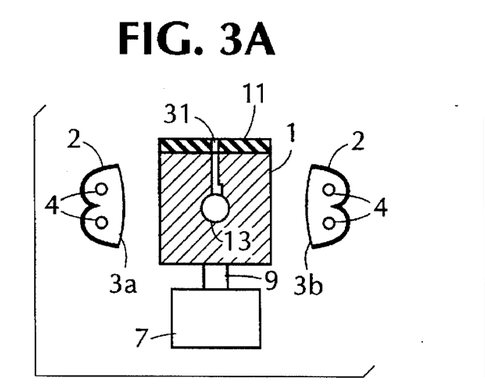
FIGS. 3A and 3B are side cross-sectional views taken along lines 3A–3A' and 3B–3B' of FIG. 2, respectively.
Figure 3B:
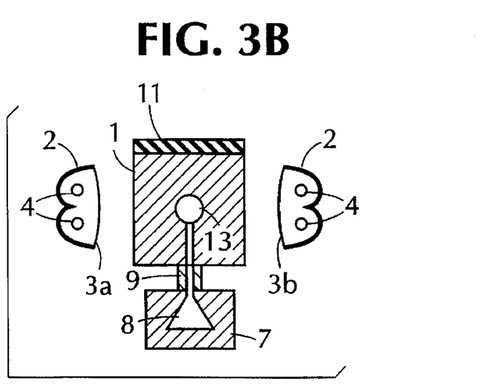
Figure 4:
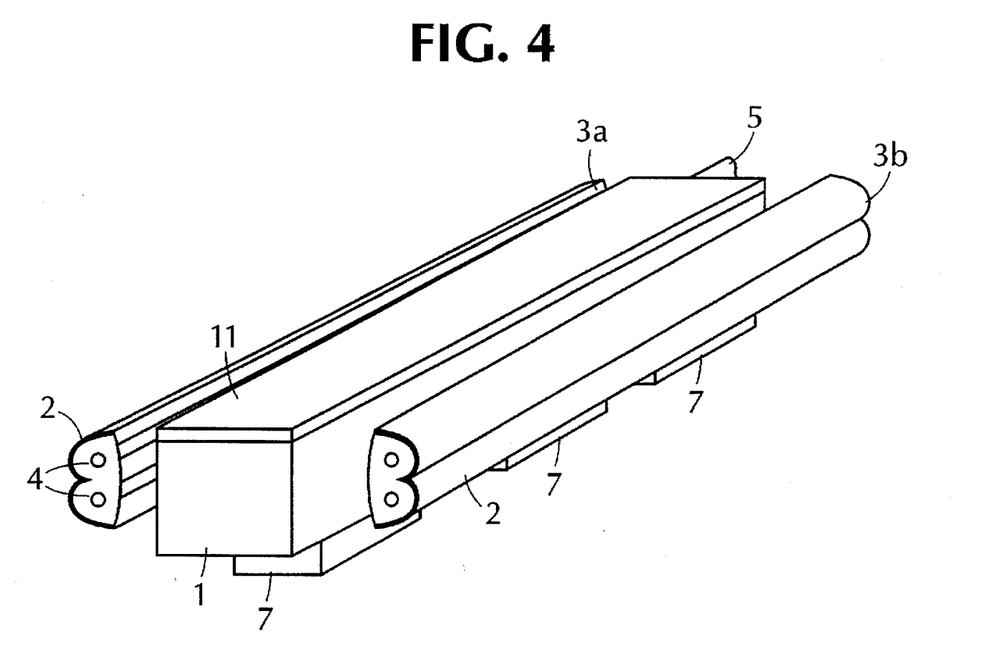
FIG. 4 is a perspective view of the first embodiment of the invention.
Figure 5:
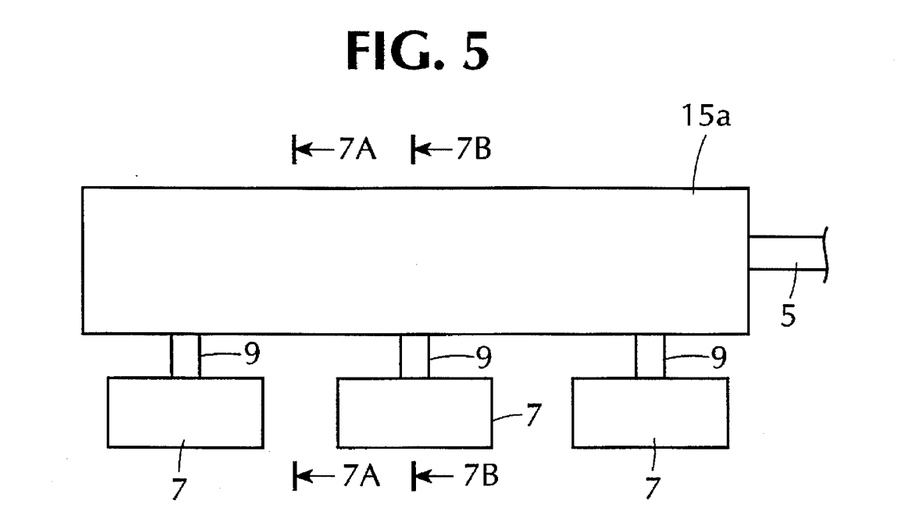
FIG. 5 is a side view of a second embodiment of the present invention.
Figure 6:
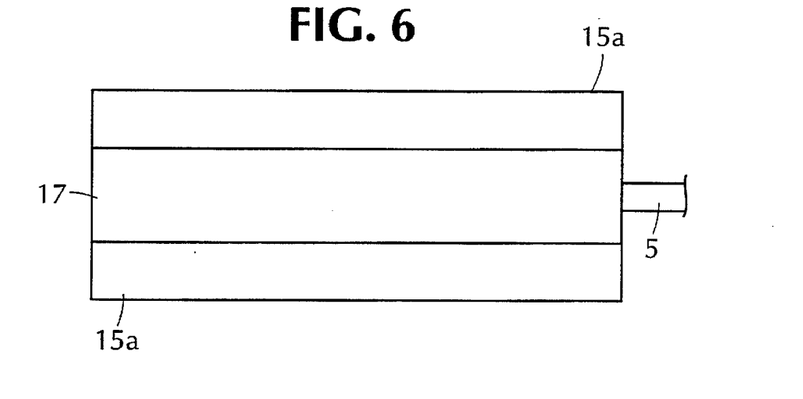
FIG. 6 is a top view of the embodiment of the invention shown in FIG. 5.

As shown in FIGS. 3 and 4, the manifold 1 is approximately square in cross-section, and has a single central circular bore 13 running along the manifold's center. Preferably, the walls of the manifold are quite thick in proportion to the diameter of the bore running therethrough. Incidentally, other manifold shapes could be used; for example, the manifold need not be square in cross section, and it could be bent or twisted along its length. Other bore shapes could be used, and the manifold could have more than one bore.

As shown in FIG. 3, plastic flows under pressure through the bore 13, enters into drop 9 and then into mold cavity 8. Although the embodiment depicted in FIG. 1 has three molds 7 associated with the manifold 1, any other number of molds could be used.

Figure 1:
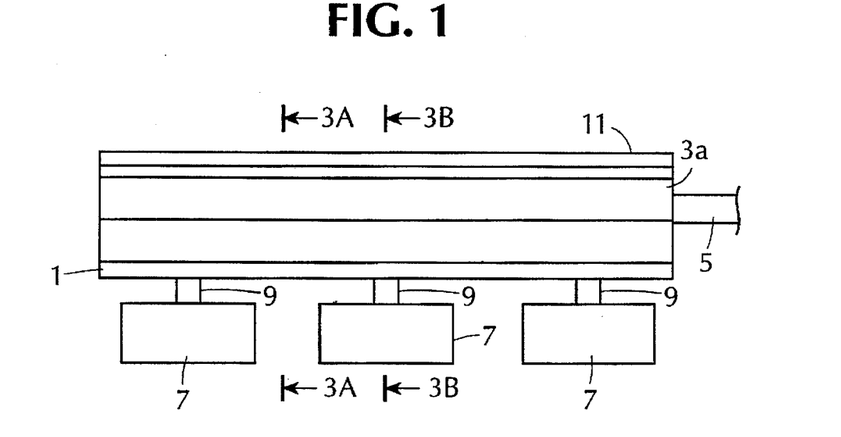
FIG. 1 is a side view of a first embodiment of the present invention.
Figure 2:
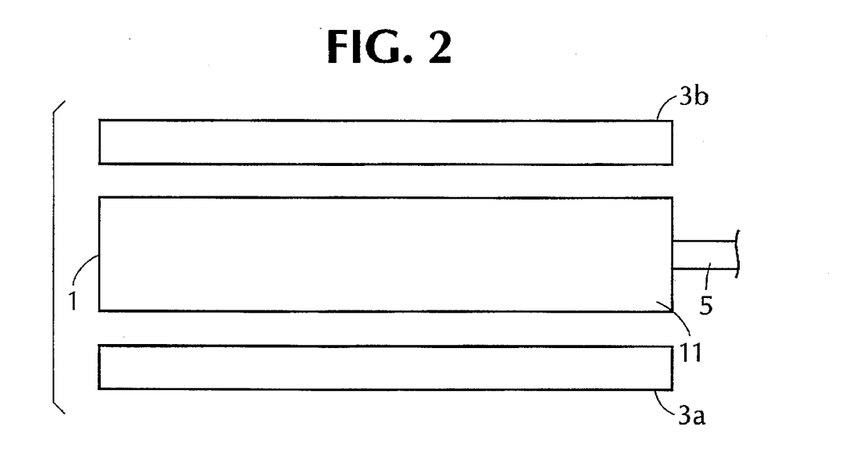
FIG. 2 is a top view of the embodiment of the invention shown in FIG. 1.

Two infrared heaters 3a, 3b are provided to heat the manifold 1, one heater being disposed on each side of the manifold. Each heater emits infrared energy, which is absorbed by and so heats the manifold. Thus, the plastic flowing through the bore 13 into the molds 7 is kept within a suitable temperature range, and preferably, at the optimal processing temperature. Those of ordinary skill in the art will appreciate that values for the temperature range and optimal processing temperature will vary depending upon factors such as the type of plastic being used and the type of product being molded, and will be able to determine those values themselves.

Preferably, the infrared heaters 3a, 3b are at least as long as the manifold 1, and are constructed to apply a constant energy flux across the surface of the manifold facing the heater. Preferred heaters emit infrared energy having a wavelength of 0.4–1.8 μm, and are of the twin-tube design. The overall efficiency of the heaters is improved by providing an integral gold-coated reflector 2 behind the emitter rods 4. This reflector 2 insures that most of the emitted energy reaches the surface of the manifold 1. Power transfers of between about 2–100 W/in$^2$, and preferably not more than about 20 W/in$^2$ can be used to heat the manifold; of course, more or less power could be used. For example, the manifold could be preheated rapidly, and then allowed to equilibrate, before plastic flows therethrough. These heaters are particularly advantageous because the emitted infrared energy flux is highly uniform and easily regulated. Heaters of this type are available from Heraeus Amersil Inc., Infrared Division, of Buford, Ga. Similar heaters available from General Electric could also be used.

Care should be taken not to apply too much infrared energy to the manifold. If too high a radiation flux is used, hot spots may form. Thus, it is desirable to apply power at a level which is low enough so that heat can be conducted readily from the manifold surface into the manifold.

The infrared radiation emitted by each heater 3a, 3b is absorbed by and so heats the surface of the manifold 1. Since the energy flux applied to opposite sides of the manifold is quite uniform, the manifold will be heated evenly, save for minor edge effects which can be ignored here. Since the thick-walled manifold has a large thermal mass, it does not change temperature quickly. Moreover, this thermal mass helps to prevent local temperature variations. Thus, once the manifold has achieved steady-state operation, it will be easy to keep its temperature constant. Moreover, any temperature variations which do occur take place at the surface of the manifold. This means that thermal conduction within the manifold body tends to "even out" such variations, and they will not affect the plastic in the bore 13.

Efficiency can be improved by covering one or more sides of the manifold with insulation 11, such as polyester material. For example, if two infrared radiation sources apply energy to opposing sides of a square manifold, then the other sides could be covered with insulation.

Insulation could cover all or just a portion of the side of the manifold. Insulation could even be provided on the manifold sides facing the infrared heaters, and portions of the manifold sides could be kept free of insulation, such as by slots or channels, so that infrared energy could still reach the manifold surface.

Performance can also be improved by matching the frequency of the infrared energy emitted by the heaters to the absorption characteristics of the manifold.

The manifold 1 itself can be of known construction. For example, it could be constructed from P20 steel, or 4120 or 4130 stainless steel, and bore 13 could be lined with chrome plate and then polished. This construction is advantageous because such a manifold could be refinished by replating and repolishing. Of course it will be appreciated that the instant invention is in no way limited to the foregoing or following materials and/or techniques, and that a broad range of materials and techniques can be employed to practice this invention.

Tests of a model manifold (16"×2½"×3½") confirmed that the present invention allows remarkable control of the manifold temperature. This model employed an infrared emitter manufactured by Heraeus Amersil Inc., Infrared Division. The temperature along the surface of the manifold varied by not more than 1° C. from the set temperature. The temperature variation in the bore of the manifold was less than 2° C. Again, any other thermoplastic material, such as polystyrene, polyethylene, polypropylene, thermoplastic urethanes, thermoplastic olefins, thermoplastic rubbers, could be used. It is believed that this invention is particularly well-suited for use with engineered thermoplastics. The invention is also applicable the use with adhesives, and any other fluids for which it is desirable to control the fluid temperature as it is conveyed along a manifold.

As will now be explained, a variety of different control systems can be used to regulate the infrared heaters. Preferably, the heaters are controlled so that temperature corrections are made slowly, allowing time for thermal conduction in the manifold body to "even out" any unwanted temperature variations.

The temperature of the plastic within the manifold bore 13 can either be measured directly, such as by using a fiber optic sensor extending into the manifold, or a thermocouple (not shown) detecting the temperature of the manifold itself. In the latter case, if desired, the temperature of the material within the manifold can be determined by mathematical modeling based on the known surface temperature of the manifold. Other known measuring devices and techniques can be used.

Figure 10:
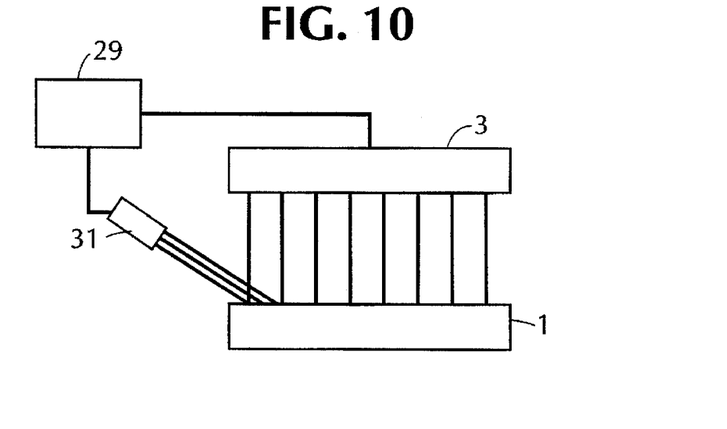
FIG. 10 is a block diagram which shows an embodiment of a control system for use in the present invention.

FIG. 10 generally illustrates a control system for the present invention, which can be used to control either of the above-noted embodiments of the invention. In this embodiment, infrared heater 3 is controlled by a computer/ process controller 29. The computer/process controller 29 preferably causes the heater 3 to emit infrared energy having a wavelength between 7000–40,000 Angstroms into manifold 1. A fiber-optic probe 31 is coupled to the computer/ process controller 29, and the fiber-optic probe 31 monitors the absolute temperature of the fluid in the manifold's bore. Based upon the feedback from fiber-optic probe 31, the controller 29 adjusts the power of infrared energy emitted by heater 3 to apply to the manifold 1 the desired level of power. This power level will vary depending on whether the device is warming up, or is in steady-state operation.

Alternatively, the fiber-optic probe can be replaced by a thermocouple which detects the temperature of the manifold surface. The controller can adjust the heater power to maintain the manifold surface temperature at a desired value.

The aforementioned control system is conventional and is commercially-available.

It will be understood that the infrared heaters 3a, 3b could be provided in other configurations and numbers; for example, four heaters could be employed, with a single heater facing each side of the manifold. Alternatively, one heater could be used. It is also possible to employ infrared reflectors to direct the energy from one or more heaters toward different sides of the manifold.

Figure 7A:
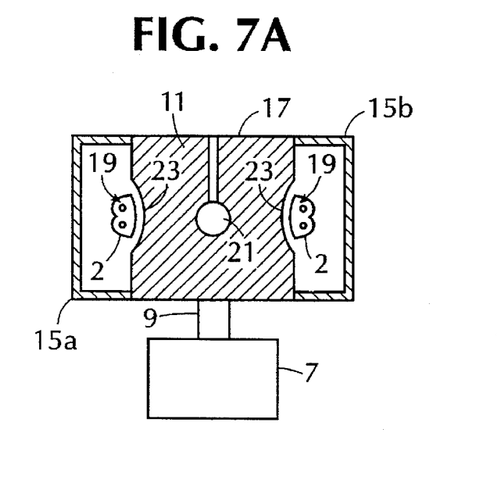
FIGS. 7A and 7B are side cross-sectional views taken along lines and of FIG. 6, respectively.
Figure 7B:
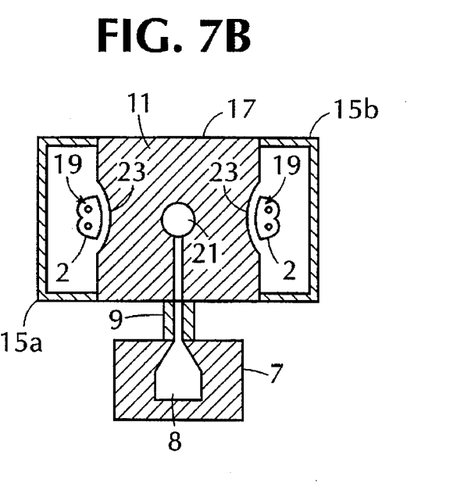
Figure 8:
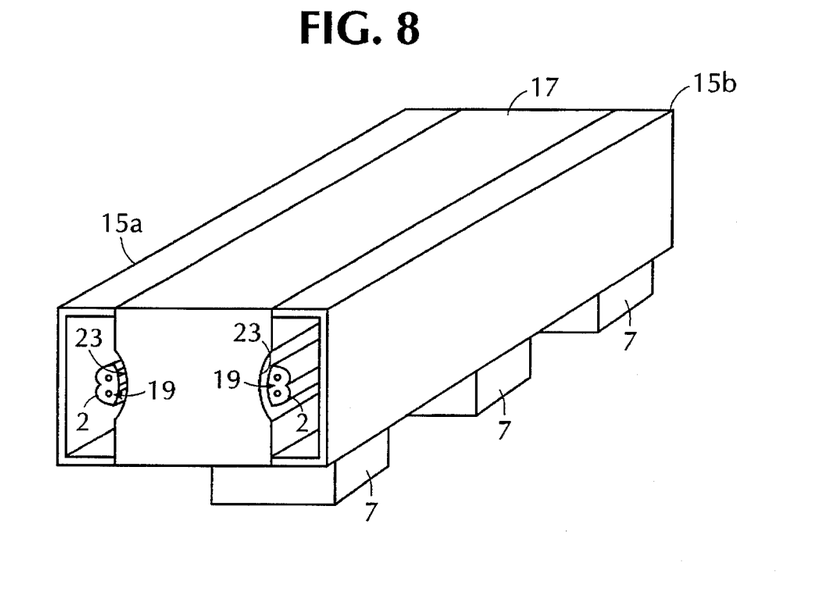
FIG. 8 is a perspective view of the second embodiment of the invention.
Figure 9:
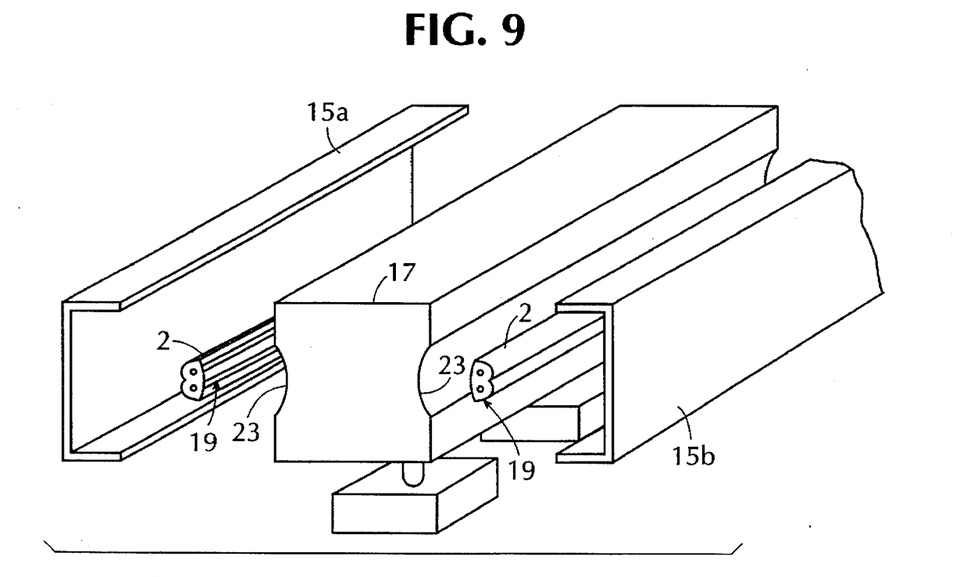
FIG. 9 is an exploded perspective view of the second embodiment of the invention.

In a second embodiment of the present invention, two infrared radiation sources 19 are used, one disposed on either side of the manifold 17. As shown in FIGS. 7–9, instead of a square cross-section, the manifold 17 has "C"-shaped concavities 23 on each side. These concavities 23 run along the length of the manifold 17. Manifold covers 15a, 15b fit onto each of the sides of the manifold. As shown in FIGS. 7–9, these manifold covers are made of suitably-bent sheet metal. The concavities 23 and interior portion of the sheet metal manifold covers 15a, 15b face one another to form chambers in which the infrared radiation sources 19 are located. Again, a single bore 21 for conveying molten plastic runs through the center of the manifold 17. Thus, the sheet metal covers serve to protect the infrared radiation sources, and also serve to reduce heat loss from the manifold assembly. If desirable, the covers could be contained or be surrounded by insulating material.

Preferably, the manifold covers 15a, 15b are removably attached to the manifold 17, using screws, bolts or any other suitable fastening technique. This way, the infrared radiation sources 19 can be accessed and changed, if necessary. Alternatively, the manifold covers 15a, 15b could be permanently attached to the manifold, using techniques such as welding.

It will also be appreciated that the manifold covers 15a, 15b could be formed in a variety of other ways, such as by stamping, casting, or machining, and that the instant invention covers such covers regardless of how they are formed.

This embodiment could be constructed using materials and techniques similar to those described in connection with the previous embodiment. Similar control systems could be used.

As shown in FIGS. 7A-9, each of the infrared radiation sources has an integral gold reflector 2 disposed such that most all of the emitted energy is directed toward the manifold 17. In this embodiment, the manifold will be heated by the infrared radiation, while the manifold covers 15a, 15b will not. In an alternative embodiment of the invention, the gold reflectors 2 can be omitted so that infrared radiation will also strike the manifold covers. One benefit of this construction is that it can keep the manifold body covers at about the same temperature and this will limit any differences in thermally-induced expansion between the manifold and the manifold covers, reducing stress levels in the assembly.

Again, it is possible to provide other heater configurations. For example, heaters and grooves could be placed on all four sides of the manifold. Alternatively, each side of the manifold could have more than one lengthwise groove, so that more than one heater could be provided on each side of the manifold (the manifold covers would have matching grooves formed therein).

Thus far, the infrared heaters described have extended along the full length of the manifold. An alternate structure could employ several smaller heaters disposed along the length of the manifold so that the ends of adjacent heaters are in abutting, or nearly abutting, relation. Since the individual heaters could be controlled separately, more precise regulation of the manifold temperature would be possible. Moreover, if desirable, one could heat the manifold so that it has a thermal profile which varies along its length. Again, heaters could be arranged around the manifolds in other configurations, and could be provided along more or less than two sides.

Although the present invention is described in terms of an injection molding manifold, its use is not limited thereto. It could also be used in barrel heaters or slot extrusion dies, or wherever is desirable to regulate the temperature of a body which conveys molten material.

It will be appreciated that the present invention is not confined precisely to the embodiments and aspects of the invention previously discussed. Numerous changes in materials and structures can be implemented which will differ from but nevertheless remain equivalent to the present invention. Thus, it is possible to implement this invention in a great many ways without departing from the spirit and scope of the claimed invention.

What we claim is:

1. A distribution manifold assembly for carrying a fluid, comprising:

a manifold body having at least one fluid channel running therethrough, and having an external surface;

at least one infrared radiation source dimensioned and disposed to apply infrared radiation with a substantially constant energy flux across said external surface of said manifold body, so that said external surface has a substantially even temperature profile;

control means for controlling application of infrared radiation by said infrared radiation source so that a temperature within said fluid channel remains within a predetermined range, said control means comprising, measuring means for measuring an absolute temperature of said fluid; and a computer or process controller for controlling at least one said infrared radiation source in accordance with said absolute temperature of said fluid measured by said measuring means.

2. A distribution manifold assembly according to claim 1, wherein said measuring means comprises a fiber-optic probe for measuring said absolute temperature of said fluid, and said computer or process controller controls at least one said infrared radiation source in accordance with said absolute temperature of said fluid measured by said fiber-optic probe.

3. A distribution manifold assembly according to claim 1, wherein said measuring means comprises a thermocouple for detecting a temperature of said manifold and said computer or process controller controls said infrared radiation source in accordance with said temperature of said manifold detected by said thermocouple.

4. A distribution manifold assembly according to claim 1, wherein said measuring means comprises:

a fiber-optic probe for measuring the absolute temperature of said fluid; and a thermocouple for detecting a temperature of said manifold; and said computer or process controller controls said infrared radiation source in accordance with at least one of said absolute temperature of said fluid measured by said fiber-optic probe and said temperature of said manifold detected by said thermocouple.

5. A distribution manifold assembly according to claim 1, further comprising:

an insulation layer surrounding at least a portion of said manifold body, said insulation layer being disposed so as not to obstruct completely said infrared radiation source.

6. A distribution manifold assembly according to claim 1, wherein said infrared radiation source comprises:

at least one filament which emits an infrared radiation when energized; and a reflector, said reflector being dimensioned and disposed so as to direct said infrared radiation emitted by said filament.

7. A distribution manifold assembly according to claim 1, wherein said infrared radiation reaching said external surface of said manifold body has an energy density of between about 2–100 watts/in$^2$.

8. A distribution manifold assembly according to claim 1, wherein said infrared radiation reaching said external surface of said manifold body has an energy density of not more than about 20 watts/in$^2$.

9. A distribution manifold assembly according to claim 1, wherein said distribution manifold assembly is used in plastic injection molding.

10. A distribution manifold assembly as in claim 1, wherein said temperature within said fluid channel remains substantially constant.

11. A distribution manifold assembly for carrying a fluid, comprising:

a primary manifold body having at least one fluid channel running therethrough, a first external surface having a first concavity running therealong and a second external surface having a second concavity running therealong;

a first manifold cover mounted on said first external surface of said primary manifold body, and at least partially enclosing said first external surface;

a second manifold cover mounted on said second external surface of said primary manifold body, and at least partially enclosing said second external surface;

a first infrared radiation source facing said first concavity, and dimensioned and disposed to apply infrared radiation with a substantially constant energy flux across said wall of said first concavity, so that said wall of said first concavity has a substantially even temperature profile, said first infrared radiation source being at least partially covered by said first manifold cover;

a second infrared radiation source facing said second concavity, and dimensioned and disposed to apply infrared radiation with a substantially constant energy flux across said wall of said second concavity, so that said wall of said second concavity has a substantially even temperature profile, said second infrared radiation source being at least partially covered by said first manifold cover;

control means for controlling application of infrared radiation by at least one of said first and said second infrared radiation sources so that a temperature within said fluid channel remains within a predetermined range, said control means comprising measuring means for measuring an absolute temperature of said fluid; and a computer or process controller for controlling said infrared radiation source in accordance with said absolute temperature of said fluid measured by said measuring means.

12. A distribution manifold assembly according to claim 11, wherein said measuring means comprises a fiber-optic probe for measuring said absolute temperature of said fluid, and said computer or process controller controls said infrared radiation source in accordance with said absolute temperature of said fluid measured by said fiber-optic probe.

13. A distribution manifold assembly according to claim 11, wherein said measuring means comprises a thermocouple for detecting a temperature of said manifold and said computer or process controller controls at least one said infrared radiation source in accordance with said temperature of said manifold detected by said thermocouple.

14. A distribution manifold assembly according to claim 11, wherein said measuring means further comprises a fiber-optic probe for measuring the absolute temperature of said fluid, and a thermocouple for detecting a temperature of said manifold; and said computer or process controller controls at least one said infrared radiation source in accordance with at least one of said absolute temperature of said fluid measured by said fiber-optic probe and said temperature of said manifold detected by said thermocouple.

15. A distribution manifold assembly according to claim 11, further comprising:

an insulation layer surrounding at least a portion of at least one of said primary manifold body, said first manifold cover, and said second manifold cover.

16. A distribution manifold assembly according to claim 11, wherein each of said first and said second infrared radiation sources comprises:

at least one filament which emits an infrared radiation when energized; and a reflector, said reflector being dimensioned and disposed so as to direct said infrared radiation emitted by said filament.

17. A distribution manifold assembly according to claim 11, wherein said infrared radiation reaching said first and said second concavities in said primary manifold body has an energy density of between about 2–100 watts/in$^2$.

18. A distribution manifold assembly according to claim 11, wherein said infrared radiation reaching said first and said second concavities in said primary manifold body has an energy density of not more than about 20 watts/in$^2$.

19. A distribution manifold assembly according to claim 11, wherein said distribution manifold assembly is used in plastic injection molding.

20. A distribution manifold assembly as in claim 11, wherein said temperature within said fluid channel remains substantially constant.

21. A distribution manifold assembly for carrying a fluid, comprising:

a manifold body having at least one fluid channel running therethrough, and having an external surface;

at least one infrared radiation source dimensioned and disposed to apply infrared radiation with a substantially constant energy flux across said external surface of said manifold body, so that said external surface has a substantially even temperature profile;

control means for controlling application of infrared radiation by said infrared radiation source so that a temperature within said fluid channel remains within a predetermined range, said control means comprising, measuring means for measuring an absolute temperature of said manifold; and a computer or process controller for controlling at least one said infrared radiation source in accordance with said absolute temperature of said manifold measured by said measuring means.

* * * * *

UNITED STATES PATENT AND TRADEMARK OFFICE
CERTIFICATE OF CORRECTION

PATENT NO. : 5,645,867

DATED : July 8, 1997

INVENTOR(S) : DOUG CRANK, ET AL.                              Page 1 of 2

It is certified that error appears in the above-identified patent and that said Letters Patent is hereby corrected as shown below:

Item [57] ABSTRACT

Line 7, "by within" should read --by the infrared radiation source so that the temperature within--.

COLUMN 1

Line 3, "continuation-in-part" should be deleted; and
    Line 32, "effects" should read --affects--.

COLUMN 2

Line 22, "CL" should read --HCl--.

COLUMN 3

Line 61, "with the" (second occurrence) should be deleted.

COLUMN 4

Line 2, "FIG. 2" should read --FIG. 1--; and
    Line 10, "along lines and" should be deleted.

COLUMN 6

Line 11, "the" should read --for--.

UNITED STATES PATENT AND TRADEMARK OFFICE
CERTIFICATE OF CORRECTION

PATENT NO. : 5,645,867

DATED : July 8, 1997

INVENTOR(S) : DOUG CRANK, ET AL.

It is certified that error appears in the above-identified patent and that said Letters Patent is hereby corrected as shown below:

<u>COLUMN 7</u>

Line 26, "most" should read --almost--.

Signed and Sealed this

Twenty-seventh Day of January, 1998

*Attest:*

*Attesting Officer*

BRUCE LEHMAN

*Commissioner of Patents and Trademarks*